US007869927B2

(12) United States Patent
Uematsu (10) Patent No.: US 7,869,927 B2
(45) Date of Patent: Jan. 11, 2011

(54) RETARDER CONTROL DEVICE FOR WORKING VEHICLE

(75) Inventor: Koji Uematsu, Mooka (JP)

(73) Assignee: Komatsu Ltd., Tokyo (JP)

( * ) Notice: Subject to any disclaimer, the term of this patent is extended or adjusted under 35 U.S.C. 154(b) by 570 days.

(21) Appl. No.: 11/994,631

(22) PCT Filed: Jul. 7, 2006

(86) PCT No.: PCT/JP2006/313542

§ 371 (c)(1),
(2), (4) Date: Jan. 3, 2008

(87) PCT Pub. No.: WO2007/007652

PCT Pub. Date: Jan. 18, 2007

(65) Prior Publication Data

US 2009/0112391 A1   Apr. 30, 2009

(30) Foreign Application Priority Data

Jul. 7, 2005   (JP) .............................. 2005-199415

(51) Int. Cl.
*B60T 7/12*   (2006.01)
*B60T 10/00*   (2006.01)
(52) U.S. Cl. ........................................ 701/70; 303/125
(58) Field of Classification Search ........................ None
See application file for complete search history.

(56) References Cited

U.S. PATENT DOCUMENTS

| 5,983,149 | A | * | 11/1999 | Tate et al. ...................... 701/48 |
| 6,249,733 | B1 | * | 6/2001 | Smith .......................... 701/50 |
| 6,299,263 | B1 | * | 10/2001 | Uematsu et al. ............. 303/192 |
| 6,770,008 | B2 | | 8/2004 | Shinojima et al. |

2005/0065693 A1 * 3/2005 Wang et al. .................... 701/70

FOREIGN PATENT DOCUMENTS

JP   63-148838 U   9/1988

(Continued)

OTHER PUBLICATIONS

Notification Concerning Transmittal of Copy of International Preliminary Report on Patentability, Chapter I of the Patent Cooperation Treaty (undated) for PCT/JP2006/313542, 4 sheets.

*Primary Examiner*—Michael J. Zanelli
(74) *Attorney, Agent, or Firm*—Holtz, Holtz, Goodman & Chick, PC (57) ABSTRACT

A retarder control system for a working vehicle includes: an input shaft revolution speed detector (121) for detecting an input shaft revolution speed of a transmission; a running state acquirer (33) for acquiring a running state of the working vehicle; a threshold map storage (321) for storing a plurality of threshold maps of an input shaft revolution speed at which the retarder braking control starts or ends in accordance with a predetermined running state of the working vehicle; a threshold map selector (34) for selecting a threshold map from the threshold maps stored in the threshold map storage based on the running state acquired by the running state acquirer; and a braking controller (35) for retarder braking control based on the input shaft revolution speed of the transmission detected by the input revolution speed detector (121) and the threshold map selected by the threshold map selector (34).

6 Claims, 6 Drawing Sheets

FOREIGN PATENT DOCUMENTS

| | | |
|---|---|---|
| JP | 06-313749 A | 11/1994 |
| JP | 7-91532 A | 4/1995 |
| JP | 7-035222 A | 6/1995 |
| JP | 8-113134 A | 5/1996 |
| JP | 8-298703 A | 11/1996 |
| JP | 10-198417 A | 7/1998 |
| JP | 2003-118433 A | 4/2003 |
| JP | 2003-301941 A | 10/2003 |

* cited by examiner

| ACCELERATION a | SUSPENSION PRESSURE b | | |
|---|---|---|---|
| | ≤b1 | ≤b2 | ≤b3 |
| ≤A1 | MAP1 | MAP5 | MAP9 |
| ≤A2 | MAP2 | MAP6 | MAP10 |
| ≤A3 | MAP3 | MAP7 | MAP11 |
| ≤A4 | MAP4 | MAP8 | MAP12 |

T2:

LOW SPEED REVOLUTION MODE 1

| SPEED STAGE | TARGET REVOLUTION SPEED (rpm) | TURN-ON REVOLUTION SPEED (rpm) | TURN-OFF REVOLUTION SPEED (rpm) |
|---|---|---|---|
| R | 2150 | 2100 | 2000 |
| F1 | 2150 | 2100 | 2000 |
| F2 | 2150 | 2100 | 2000 |
| F3 | 2150 | 2100 | 2000 |
| F4 | 2150 | 2100 | 2000 |
| F5 | 2150 | 2100 | 2000 |
| F6 | 2150 | 2100 | 2000 |
| F7 | 2150 | 2100 | 2000 |

LOW SPEED REVOLUTION MODE 2

| SPEED STAGE | TARGET REVOLUTION SPEED (rpm) | TURN-ON REVOLUTION SPEED (rpm) | TURN-OFF REVOLUTION SPEED (rpm) |
|---|---|---|---|
| R | 2100 | 2300 | 2100 |
| F1 | 2100 | 2300 | 2100 |
| F2 | 2100 | 2300 | 2100 |
| F3 | 2100 | 2300 | 2100 |
| F4 | 2100 | 2300 | 2100 |
| F5 | 2100 | 2300 | 2100 |
| F6 | 2100 | 2300 | 2100 |
| F7 | 2100 | 2300 | 2100 |

HIGH SPEED REVOLUTION MODE

| SPEED STAGE | TARGET REVOLUTION SPEED (rpm) | TURN-ON REVOLUTION SPEED (rpm) | TURN-OFF REVOLUTION SPEED (rpm) |
|---|---|---|---|
| R | 2100 | 2300 | 2100 |
| F1 | 2100 | 2300 | 2100 |
| F2 | 2100 | 2300 | 2100 |
| F3 | 2100 | 2300 | 2100 |
| F4 | 2100 | 2300 | 2100 |
| F5 | 2100 | 2300 | 2100 |
| F6 | 2100 | 2300 | 2100 |
| F7 | 2100 | 2300 | 2100 |

RETARDER CONTROL DEVICE FOR WORKING VEHICLE

This application is a U.S. National Phase Application under 35 USC 371 of International Application PCT/JP2006/313542 filed Jul. 7, 2006.

TECHNICAL FIELD

The present invention relates to a retarder control system for a working vehicle, which automatically controls a retarder that brakes a working vehicle, the working vehicle having: an engine that is loaded on a vehicle body of the vehicle; a transmission that transmits output revolutions of the engine; and driving wheels that is driven by the output revolutions of the transmission.

BACKGROUND ART

Conventionally, a vehicle such as a dump truck is provided with a retarder to prevent an overrun of an engine in going down a long hill with a heavy load on. The retarder is controlled by a retarder control system. The retarder control system detects revolution speeds of an engine output shaft and a transmission input shaft. When the detected revolution speeds of the shafts reach a predetermined value, the retarder control system activates the retarder to prevent the overrun of the engine (e.g., cf. Patent Document 1).

[Patent Document] JP-A-10-198417 (FIG. 2, p. 2)

DISCLOSURE OF THE INVENTION

Problems to be Solved by the Invention

However, according to the technique shown in Patent Document 1, the retarder is activated based only on the revolution speeds of the engine reaching a predetermined value, so that the retarder nearly fully brakes the vehicle once the retarder brake is activated. Meanwhile, the operator is controlling the working vehicle by manipulating the accelerator and the brake, as well as paying attention to the load condition of the vehicle of the working vehicle, the inclination of the hill on which he/she is going down, etc. An unexpected braking by the retarder deprives the operator of smooth manipulation.

An object of the present invention is to provide a retarder control system for a working vehicle, which adjusts the retarder braking in accordance with running states so as to enable comfortable, satisfactory manipulation.

Means for Solving the Problems

A retarder control system for a working vehicle according to the present invention has an engine loaded on a vehicle body, a transmission for changing output revolutions of the engine, and driving wheels driven by the output revolutions of the transmission, the retarder control system including: an input shaft revolution speed detector that detects an input shaft revolution speed of the transmission; a running state acquirer that acquires a running state of the working vehicle; a threshold map storage that stores a plurality of threshold maps of the input shaft revolution speed at which retarder braking control is started or ended in accordance with a predetermined running state of the working vehicle; a threshold map selector that selects a threshold map from the threshold maps stored in the threshold map storage based on the running state acquired by the running state acquirer; and a braking controller that controls retarder braking based on the input shaft revolution speed of the transmission detected by the input shaft revolution speed detector and the threshold map selected by the threshold map selector.

According to the above aspect of the present invention, the running state acquirer obtains a running state of the working vehicle, the threshold map selector selects a threshold map corresponding to the running state obtained by the threshold map selector, and the braking controller, with reference to the selected threshold map, can control braking while monitoring the input shaft revolution speed of the transmission detected by the input shaft revolution speed detector. As a result, braking control adaptive to the running state can be achieved, thereby providing excellent operation feeling to an operator.

According to the aspect of the invention, it is preferable that, in the retarder control system for the working vehicle, the running state acquirer comprises a suspension pressure acquirer that acquires pressure of a hydraulic suspension that supports a load applying on the working vehicle, the threshold map storage stores different threshold maps in accordance with predetermined suspension pressure, and the threshold map selector selects the threshold map based on the suspension pressure acquired by the suspension pressure acquirer.

According to the above aspect of the present invention, since a threshold map is selected by the threshold map selector based on a suspension pressure obtained by the suspension pressure acquirer, the retarder can be controlled in accordance with a load condition while taking inertia of the load into consideration.

According to the aspect of the invention, it is preferable that, in the retarder control system for the working vehicle, the running state acquirer includes an attitude acquirer that acquires an attitude of the working vehicle, the threshold map storage stores different threshold maps in accordance with predetermined attitudes of the working vehicle, and the threshold map selector selects a threshold map based on the attitude of the working vehicle acquired by the attitude acquirer.

According to the above aspect of the present invention, since a threshold map is selected by the threshold map selector based on the attitude of the working vehicle obtained by the vehicle attitude acquirer, when the working vehicle is going uphill, downhill, etc., retarder control can be performed in a manner suitable for the situation.

According to the aspect of the invention, it is preferable that, in the retarder control system for the working vehicle, the running state acquirer includes a manipulation state acquirer that acquires a manipulation state of a manipulating system for manipulating the working vehicle, the threshold map storage stores different threshold maps in accordance with predetermined manipulation states of the working vehicle, and the threshold map selector selects a threshold map based on the manipulation state acquired by the manipulation state acquirer.

According to the above aspect of the present invention, since a threshold map is selected by the threshold map selector based on the manipulation state obtained by the manipulation state acquirer, the retarder control can be adapted to the manipulation state by the operator.

According to the aspect of the invention, it is preferable that, in the retarder control system for the working vehicle, the manipulation state acquirer detects manipulation states of a shift lever and an accelerator in the manipulating system and the threshold map selector selects a threshold map based on a speed stage position of the shift lever and pressing state of the accelerator acquired by the manipulation state acquirer.

According to the above aspect of the invention, since the manipulation state of the shift lever and accelerator pedal is detected by the manipulation state acquirer and the threshold map is selected by the threshold map selector based on the speed stage position of the shift lever and the pressing amount of the accelerator pedal, retarder control can be carried out in response to the operator's intended operation of the vehicle.

A retarder control method for a working vehicle with an engine loaded on a vehicle body, a transmission for changing output revolutions of the engine, and driving wheels driven by the output revolutions of the transmission according to an aspect of the present invention includes the steps of: storing in advance a plurality of threshold maps in accordance with a running state of the working vehicle, the threshold maps mapping input shaft revolution speeds at which retarder braking control starts or ends; detecting an input shaft revolution speed of the transmission; acquiring a running state of the working vehicle; selecting, based on the acquired running state, one of the threshold maps stored in advance; and controlling retarder braking based on the detected input shaft revolution speed of the transmission and the selected threshold map.

With the control method of the aspect of the invention, effects similar to the above effects of the control system according to the present invention can be obtained.

EXPLANATION OF CODES

11 . . . engine, 12 . . . transmission, 14 . . . wheel (driving wheel), 3 . . . controller (retarder control system), 33 . . . running state acquirer, 34 . . . threshold map selector, 41 . . . shift lever, 42 . . . accelerator pedal, 35 . . . braking controller, 121 . . . revolution detector (input shaft revolution speed detector), 321 . . . threshold map storage, 331 . . . manipulation state acquirer, 332 . . . input shaft revolution speed acquirer, 333 . . . suspension pressure acquirer, 334 . . . vehicle attitude acquirer

BEST MODE FOR CARRYING OUT THE INVENTION

An embodiment of the present invention will be described below with reference to the drawings.

1. Arrangement of Braking System 1

Figure 1:
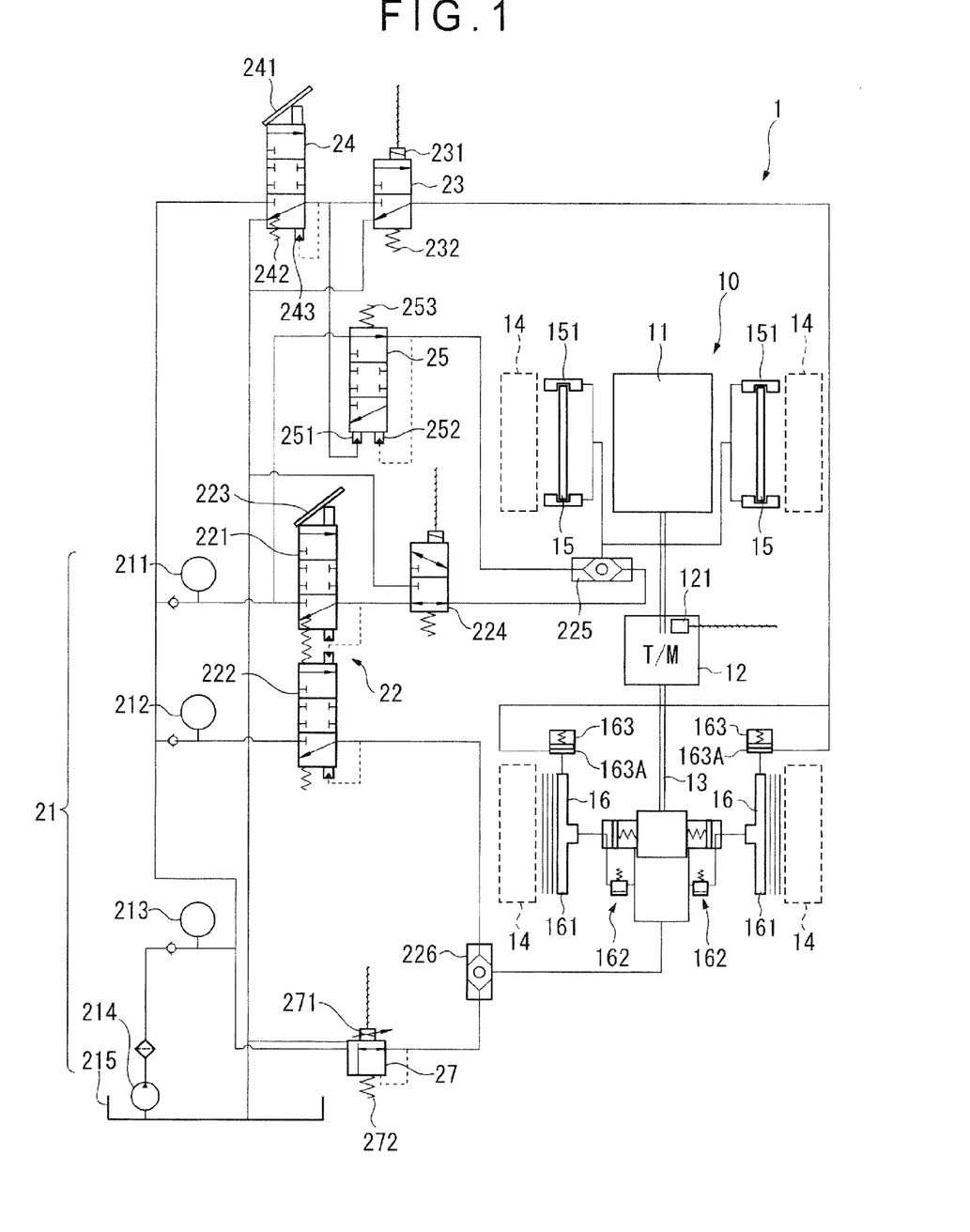
FIG. 1 is a schematic illustration showing a braking system according to an embodiment of the present invention.

FIG. 1 shows a braking system 1 according to an embodiment of the present invention. The braking system 1 is installed in a dump truck (working vehicle). A vehicle body 10 that constitutes a dump truck includes an engine 11, a transmission 12, a driving shaft 13, a differential (not shown), and a wheel 14, which transfer driving force of the engine 11 to road surface in this order.

More specifically, the revolutions of the output shaft of the engine 11 are transmitted by the transmission 12 according to a speed stage set by an operator in an operator's cab (not shown), and transferred via the differential to the rear wheel 14, which grips the road to move the vehicle.

The transmission 12 is provided with a torque converter and a planetary gear transmission (not shown). Output revolutions of the engine 11 are inputted to the planetary gear transmission via the torque converter, set to a predetermined speed stage, and outputted to the driving shaft 13. The transmission 12 has, on an input shaft of the planetary gear transmission, a revolution detector 121 for detecting the revolution speed of the input shaft. The detected revolution speed signals are outputted to a controller for controlling the retarder, which will be described below.

A front brake 15 and a rear brake 16 are provided to the vehicle body 10 at a portion that corresponds to the wheel 14.

The front brake 15 includes a front single-disc brake 151. The rear brake 16, which is an oil-cooled multi-disc brake, has a rear multi-disc brake 161, a slack adjuster 162, and a parking brake 163.

The front brake 15 and the rear brake 16 are all hydraulically controlled. The hydraulic circuit in control includes a hydraulic supply system 21, a foot brake valve 22, a parking brake valve 23, an emergency brake valve 24, a relay valve 25, a front brake cut out valve 224 and an electromagnetic proportional pressure reducing valve 27.

The hydraulic supply system 21 is provided with a plurality of hydraulic accumulators 211, 212 and 213, a hydraulic pump 214 and a reservoir 215 as a hydraulic source. Pressure oil of the hydraulic accumulators 211, 212 and 213 is delivered to the front brake 15 and the rear brake 16 via the foot brake valve 22 so as to brake the wheels 14 respectively.

The hydraulic accumulators 211, 212 and 213 function as follows: the driving source is the engine 11, which drives the hydraulic pump 214; the hydraulic pump 214 pressurizes hydraulic fluid in the reservoir 215; the pressure oil of the hydraulic pump 214 is used to accumulate pressure with a predetermined pressure; when the accumulated pressure reaches the predetermined value, an unload device (not shown) provided between the hydraulic pump 214 and the hydraulic accumulator 213 unloads the pressure oil of the hydraulic pump 214.

The foot brake valve 22 includes a front brake valve 221 and a rear brake valve 222. When a pedal 223 is manipulated, the front brake valve 221 delivers the pressure oil of the hydraulic accumulators 211 to the front brake 15 for braking, and the rear brake valve 222 delivers likewise the pressure oil of the hydraulic accumulator 212 to the rear brake 16 for braking.

To be more precise, the pedal 223 is manipulated to change a position of a spool of the front brake valve 221. The pressure oil of the hydraulic accumulator 211 is outputted from the front brake valve 221. The outputted pressure oil is supplied to the front brake 15 via the front brake cut out valve 224 and the shuttle valve 225. Braking is applied by the front brake 15.

Simultaneously, a position of a spool of the rear brake valve 222 is also changed, where pressure oil of the hydraulic accumulator 212 is outputted from the rear brake valve 222. The outputted oil is supplied to the slack adjuster 162 of the rear brake 16 via the shuttle valve 226. Braking is applied by the rear brake 16.

The parking brake valve 23 for manipulating the parking brake 163 of the rear brake 16 has a solenoid 231 and a spring 232.

When the parking switch in the operator's cab (not shown) is turned to the parking position, the parking brake valve 23 moves to a position that allows cutting off the pressure oil from the hydraulic accumulator 213. Then the pressure oil of a rear wheel cylinder chamber 163A in the parking brake 163 returns to the reservoir 215 of the hydraulic supply system 21 to remove the parking brake pressure.

Accordingly, when the vehicle is parked, the rear multi-disc brake 161 of the rear brake 16 is pressed by the rear wheel spring of the parking brake 163 to be tightly contacted to keep the vehicle braked.

When the vehicle is running, the parking switch (not shown) is turned to the running position, so that a position of the parking brake valve 23 is switched by the solenoid 231. Then the pressure oil of the hydraulic accumulator 213 is supplied to the rear wheel cylinder chamber 163A of the parking brake 163 to raise the parking brake pressure.

Accordingly, when the vehicle runs, the parking brake pressure in the rear wheel cylinder chamber 163A pushes back the rear wheel spring of the parking brake 163 to disengage and release the rear multi-disc brake 161, thereby allowing the vehicle to run.

The emergency brake valve 24, which controls the emergency braking pressure of the rear wheel cylinder chamber 163A to apply emergency braking to the vehicle, includes a foot pedal 241, a spring 242 and a pilot chamber 243.

When the vehicle runs, the emergency brake valve 24 is positioned so as to supply the pressure oil from the hydraulic accumulator 213 to the rear wheel cylinder chamber 163A of the parking brake 163 and supplies the pressure oil to the rear wheel cylinder chamber 163A for disengaging and releasing the rear multi-disc brake 161.

As the operator manipulates the foot pedal 241, the emergency brake valve 24 moves to obtain communication with the reservoir 215, decompresses the pressure oil of the hydraulic accumulator 213 to generate emergency braking pressure, and supplies pressure oil with the emergency braking pressure to the rear wheel cylinder chamber 163A of the parking brake 163.

When the emergency brake valve 24 is manipulated, the relay valve 25 gives braking force also to the front brake 15. The relay valve 25, provided to improve the braking force in an emergency braking situation, has a first pilot chamber 251, a second pilot chamber 252, and a spring 253.

The output pressure of the emergency brake valve 24 in a running situation is inputted to the first pilot chamber 251. Concurrently, the relay valve 25 is positioned to be in communication with the reservoir 215, creating a pressure reduction state of the supply line to the front brake 15, which cancels the braking by the front brake 15.

As the foot pedal 241 of the emergency brake valve 24 is manipulated, the output pressure of the emergency brake valve 24 is reduced. Consequently, pressure supplied to the first pilot chamber 251 is reduced, a position of the relay valve 25 is changed by the urging force of the spring 253, the hydraulic accumulator 211 supplies pressure oil, the front brake 15 is supplied with pressure oil, and the front brake 15 starts breaking. Accordingly, in response to emergency braking by the emergency brake valve 24, the front brake 15 begins braking.

The electromagnetic proportional pressure reducing valve 27 (a component of the retarder) is provided halfway on a pipe that extends from the hydraulic accumulator 213 to the shuttle valve 226. When the vehicle runs down a long hill with a heavy load on, in order to prevent an overrun of the engine 11, the pressure reducing valve 27 automatically prompts the rear brake 16 to brake so as to keep the velocity of the vehicle under a level where the engine 11 overruns.

The electromagnetic proportional pressure reducing valve 27 is provided with a solenoid 271 and a spring 272. The pressure reducing valve 27 adjusts the degree of opening of the pressure reducing valve 27 by the solenoid 271 based on the control signals from the below-described controller (not shown in FIG. 1), and outputs the pressure oil coming from the hydraulic accumulator 213 to the shuttle valve 226.

As for the shuttle valve 226, the pressure oil with the higher pressure of the pressure oil outputted from the rear brake valve 222 and the pressure oil outputted from the electromagnetic proportional pressure reducing valve 27 is supplied to the slack adjuster 162 of the rear brake 16. The rear brake 16 then performs braking.

Finally, the retarder according to the present invention is provided by the hydraulic accumulator 213, the electromagnetic proportional pressure reducing valve 27, the shuttle valve 226 and the rear brake 16.

2. Arrangement of Controller 3

Figure 2:
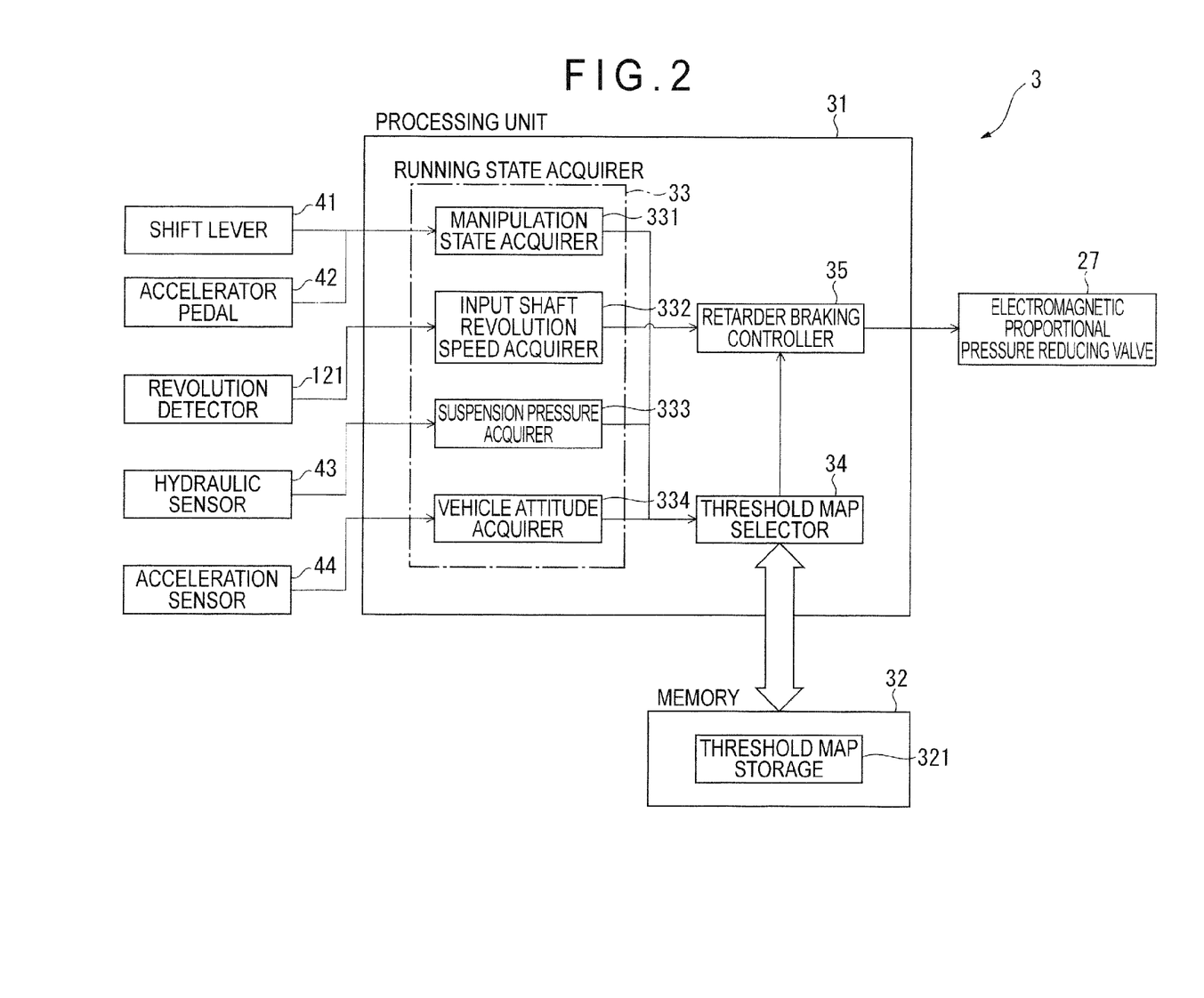
FIG. 2 is a block diagram showing an arrangement of a controller that performs retarder control according to the embodiment.

FIG. 2 shows a controller 3 for controlling the braking system 1. The controller 3 includes a processing unit 31 and a memory 32. Manipulation signals of manipulating a shift lever 41 and an accelerator pedal 42, a pressure signal of a hydraulic sensor 43, and an acceleration signal outputted from an acceleration sensor 44 are inputted to the processing unit 31. Based on the inputted signals, the processing unit 31 controls the retarder by outputting a control signal to the electromagnetic proportional pressure reducing valve 27 (a component of the retarder).

Information stored in the memory 32 (a readable nonvolatile storage) is read by the processing unit 31 and used for processing when needed.

A running state acquirer 33 for obtaining a traveling condition of the working vehicle includes a manipulation state acquirer 331, an input shaft revolution speed acquirer 332, a suspension pressure acquirer 333 and a vehicle attitude acquirer 334.

The manipulation state acquirer 331 obtains, in form of an electric signal, a condition of manipulation means determined as a result of manipulation of the shift lever 41 and the accelerator pedal 42 by an operator. In the embodiment, the manipulation state acquirer 331 obtains from the shift lever 41 in form of an electric signal a speed stage setting of the working vehicle, e.g., what the present speed stage is, or whether or not the operator is shifting gear at present time. From the accelerator pedal 42, the manipulation state acquirer 331 obtains an electric signal that tells whether the operator is pressing on the accelerator pedal 42 or not.

The input shaft revolution speed acquirer 332 is for obtaining a revolution speed signal outputted from the revolution detector 121 provided to the input shaft of the transmission 12 (described above). The revolution detector 121 senses the input shaft revolution speed of the planetary gear transmission provided subsequent to the torque converter in the transmission 12.

The suspension pressure acquirer 333 obtains a pressure signal from the hydraulic sensor 43. The hydraulic sensor 43 detects the pressure of a rear suspension of the working vehicle (not shown). As soil or other live loads in the vessel become heavier, the detected pressure signal becomes larger. In other words, the suspension pressure acquirer 333 of the embodiment functions to acquire the live load applied to the working vehicle.

The vehicle attitude acquirer 334 obtains an acceleration signal from the acceleration sensor 44 provided to the working vehicle. The acceleration sensor 44 senses a gravitational acceleration as well as the ground acceleration of the accelerating or decelerating working vehicle to detect the attitude of the vehicle running uphill or downhill. The vehicle attitude acquirer 334 recognizes the attitude of the working vehicle based on the detected acceleration signal.

A threshold map selector 34 chooses a threshold map from a threshold map storage 321 based on the various running states of the working vehicle obtained by the manipulation state acquirer 331, the suspension pressure acquirer 333, and the vehicle attitude acquirer 334.

Figure 3:
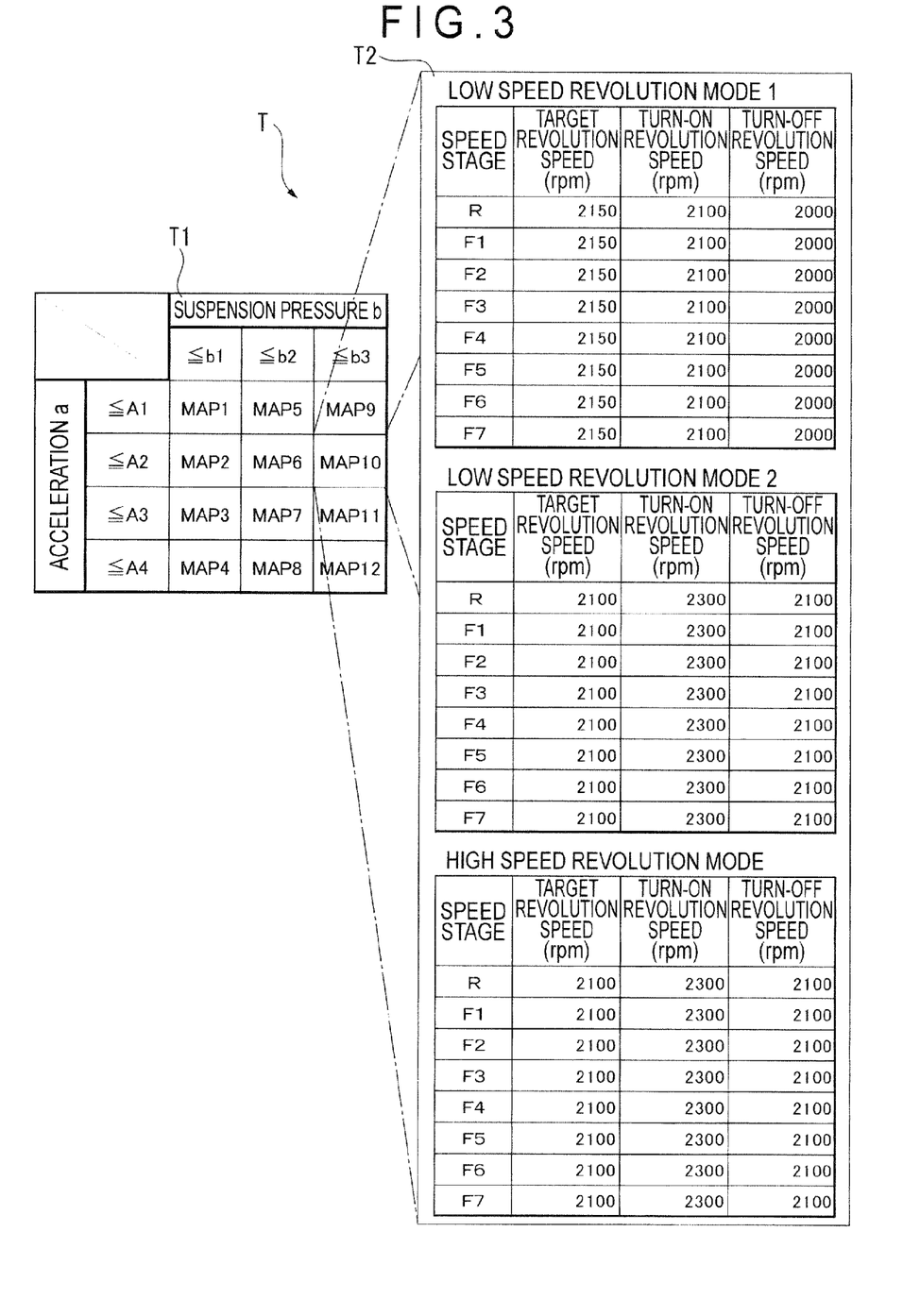
FIG. 3 is a schematic diagram showing an arrangement of a threshold map storage according to the embodiment.

As shown in FIG. 3, the threshold map storage 321 stores a threshold map (table) T, where two tables, a table T1 and a table T2, are hierarchically provided.

In the table T1, the acceleration in accordance with the acceleration signal detected by the acceleration sensor 44 is associated with a pressure signal detected by the hydraulic sensor 43. Each field stores a threshold map corresponding to a combination of the acceleration signal and a pressure signal. The map found in each field stores a threshold of input shaft revolution speed of the transmission 12 at which the retarder braking control starts and a threshold of input shaft revolution speed at which the braking control ends. As the table T2 illustrates, the thresholds vary as the manipulation state varies among a low speed revolution mode 1, a low speed revolution mode 2 and a high speed revolution mode.

The low speed revolution mode 1 is a map used when the working vehicle is running and the operator is not pressing the accelerator pedal 42. The low speed revolution mode 2 is a map used when the working vehicle is running and the operator is pressing the accelerator pedal 42. The high speed revolution mode is a map used when the operator is shifting gear.

From the threshold map storage 321 including a variety of such maps, the threshold map selector 34 selects a map suitable for the acquired running state, and outputs the selected threshold map to a retarder braking controller 35.

The retarder braking controller 35 decides whether or not to execute the retarder braking control based on the selected threshold map and the input shaft revolution speed obtained by the input shaft revolution speed acquirer 332. When a decision is made to perform the braking control, the retarder braking controller 35 generates a controlling signal for a solenoid 271 of the electromagnetic proportional pressure reducing valve 27 to adjust degree of opening thereof, thereby enabling an automatic braking control by the retarder.

The retarder braking controller 35 employs fuzzy control to carry out the braking control by the retarder. More specifically, though not shown in FIG. 2, the controller 3 has the running state acquirer 33 that obtains the revolutions of the wheel 14 and in the memory 32 a fuzzy map that interrelates the revolutions of the wheel 14 and the acceleration applied to the working vehicle, based on which the retarder braking controller 35 performs fuzzy control.

Figure 4:
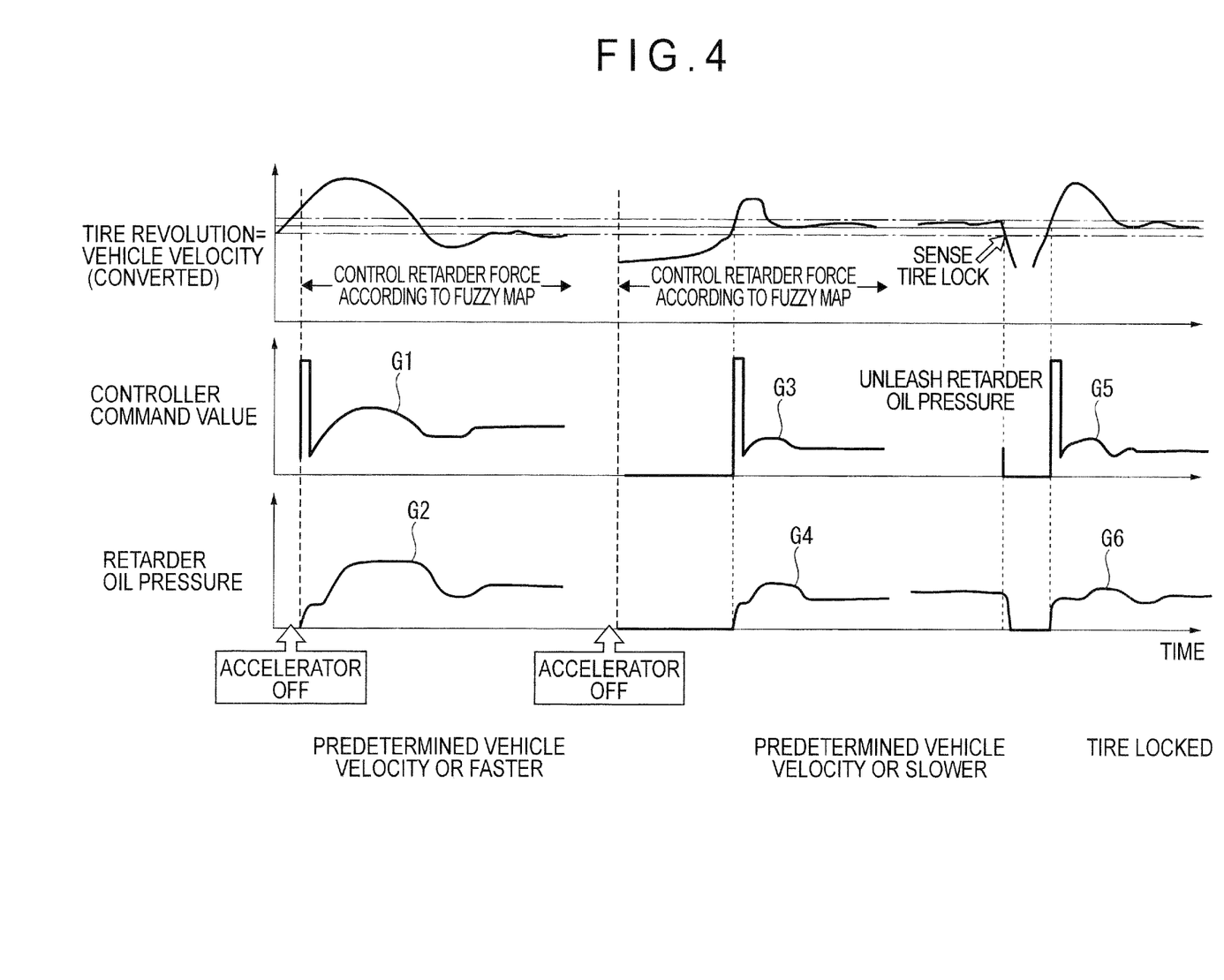
FIG. 4 is a graph for explaining fuzzy control of a retarder according to the embodiment.

For example, as shown in FIG. 4, when the acquired vehicle velocity is larger than the predetermined vehicle velocity, release of an accelerator pedal 42 triggers the retarder braking controller 35 to generate a command value like the graph G1, output the value to the solenoid 271 of the electromagnetic proportional pressure reducing valve 27, and adjusts the degree of opening of the electromagnetic proportional pressure reducing valve 27 so that the braking pressure assumes the graph G2.

When the vehicle velocity is smaller than the predetermined velocity, again release of the accelerator pedal 42 triggers the retarder braking controller 35 to generate a command value like the graph G3, output the value to the solenoid 271 of the electromagnetic proportional pressure reducing valve 27, and adjusts the degree of opening of the electromagnetic proportional pressure reducing valve 27 so that the braking pressure assumes the graph G2.

In addition, when the retarder braking controller 35 recognizes that the wheel 14 is locked, the recognition triggers the retarder braking controller 35 to generate a command value, output the value to the solenoid 271 of the electromagnetic proportional pressure reducing valve 27, and adjusts the degree of opening of the electromagnetic proportional pressure reducing valve 27 so that the braking pressure assumes the graph G6.

3. Functions of Controller 3

Figure 5:
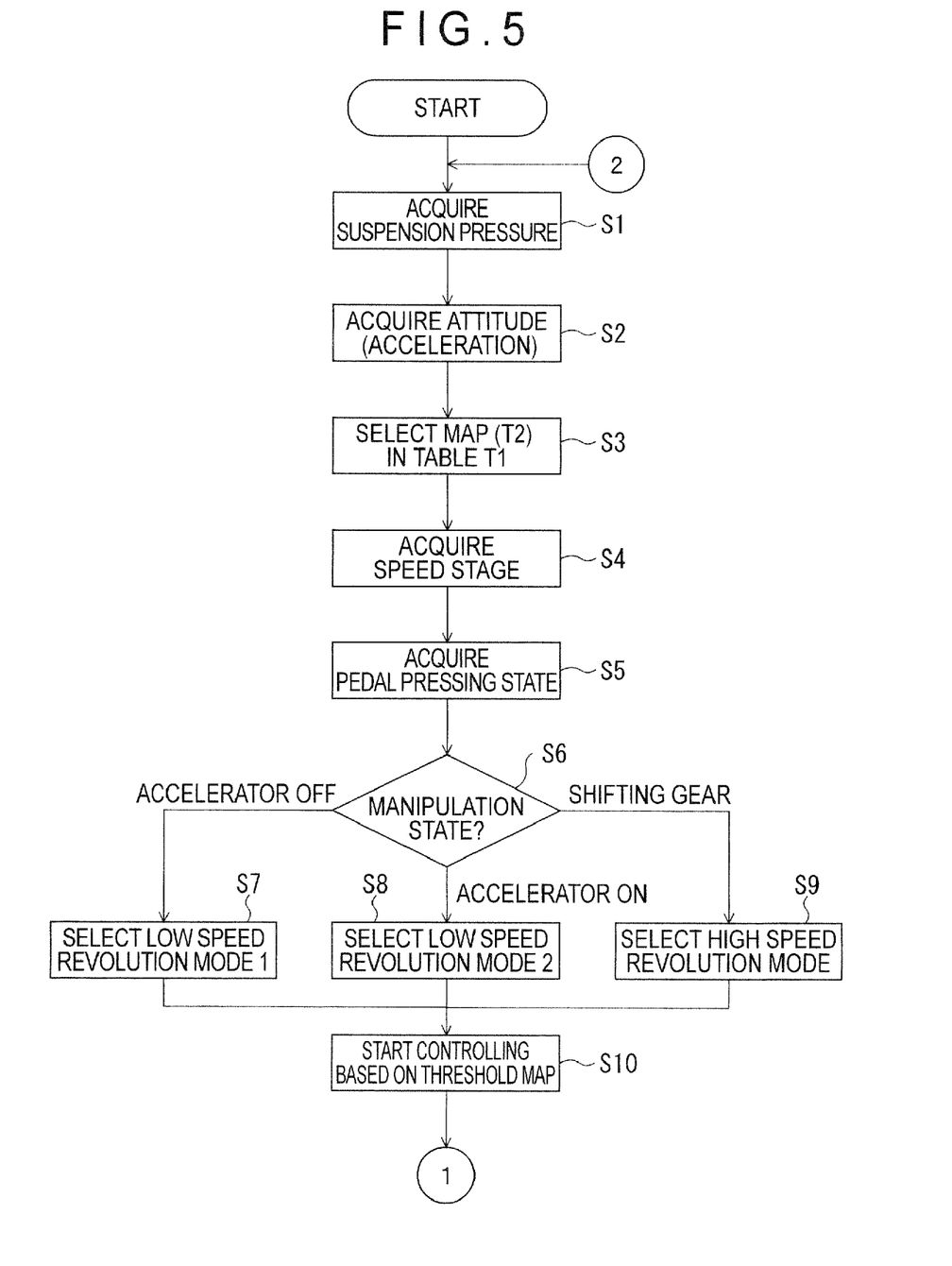
FIG. 5 is a flowchart for explaining a function of the embodiment.
Figure 6:
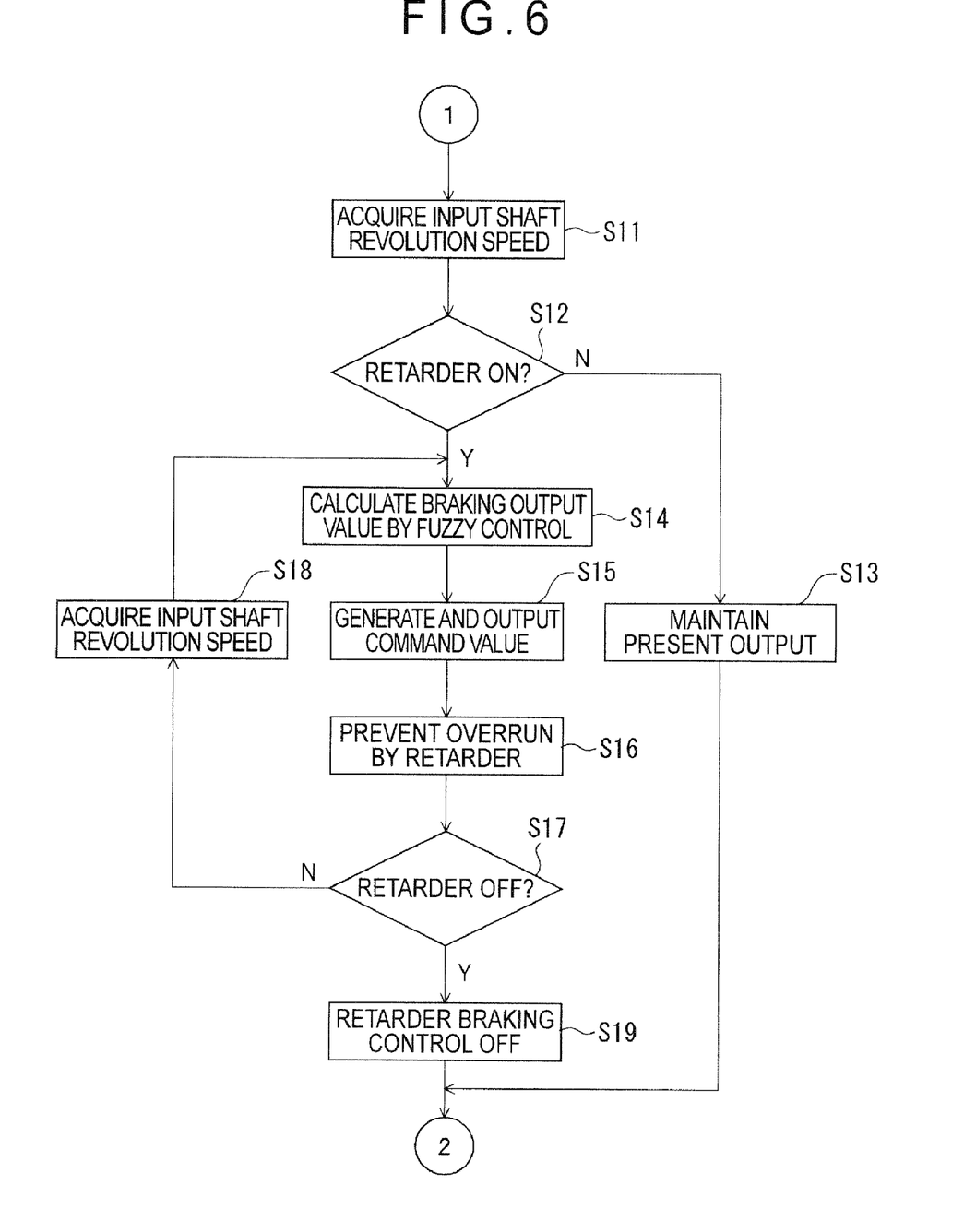
FIG. 6 is another flowchart for explaining the function of the embodiment.

Next, functions of the above-described functional units of the controller 3 will be described with reference to flowcharts shown in FIG. 5 and FIG. 6.

(1) While the working vehicle is running, the suspension pressure acquirer 333 of the controller 3 obtains the pressure signals outputted from the hydraulic sensor 43 (step S1). Next, the vehicle attitude acquirer 334 obtains the acceleration signal outputted from the acceleration sensor 44 (step S2).

(2) Based on the obtained pressure signal and acceleration signal, the threshold map selector 34 chooses a map table to use for controlling from the map tables MAP1 to MAP12 of T1 shown in FIG. 3 (step S3).

(3) The manipulation state acquirer 331 obtains the speed stage position of the shift lever 41 by the operator (step S4) and then obtains the pressing state of the accelerator pedal 42 (step S5).

(4) The threshold map selector 34 chooses a threshold map to use for control from the table T2 shown in FIG. 3 based on the acquired setting of the speed stage and pressing state of the accelerator pedal (step S6). In the embodiment, the threshold map selector 34 selects a threshold map based on: the present speed stage for overrun prevention control, having been set in accordance with a previous operation of the retarder, in addition to the following conditions.

The low speed revolution mode 1 is selected when the present speed stage is more than or equal to the shift-lever-set speed stage and the accelerator pedal is off (step S7).

The low speed revolution mode 2 is selected when the present speed stage for overrun prevention is more than or equal to the shift-lever-set speed stage and accelerator pedal is not off (step S8).

The high speed revolution mode is selected when neither of the low speed revolution modes 1 and 2 is selected. For example, the high speed revolution mode is selected in a gear shift manipulation state (step S9).

(5) When the threshold map selector 34 finishes selecting a threshold map, the retarder braking controller 35 starts controlling based on the selected threshold map (step S10).

(6) The input shaft revolution speed acquirer 332 obtains the input shaft revolution speed of the transmission 12 (step S11). Subsequently, the retarder braking controller 35 decides whether or not to activate the retarder by comparing the obtained input shaft revolution speed and the retarder control starting revolution speed according to the present set speed stage in the threshold map (step S12).

(7) When it is decided not to activate the retarder, the retarder braking controller 35 does not execute retarder control, maintains the present braking output state (step S13), and returns to the step S1.

(8) When it is decided to activate the retarder, the retarder braking controller 35 calculates a value of braking output based on fuzzy control (step S14), generates and outputs a command value for the solenoid 271 of the electromagnetic proportional pressure reducing valve 27 based on the calculated value (step S15), and performs overrun prevention based on fuzzy control (step S16).

(9) While the retarder is active, the retarder braking controller 35 monitors the input shaft revolution speed obtained by the input shaft revolution speed acquirer 332. The retarder braking controller 35 determines if the obtained input shaft revolution speed is less than the release revolution speed in the threshold map or not (step S17), and if not, obtains the input shaft revolution speed by the input shaft revolution speed acquirer (step S18) before further controlling the braking by the retarder. When the obtained input shaft revolution speed is less than the release revolution speed in the threshold map, the retarder braking controller 35 ends the retarder control (step S19) and returns to step S1.

4. Modifications of Embodiment

The present invention does not limit itself to the above embodiment but includes the following modifications.

In the above embodiment, the present invention is implemented as retarder control for a dump truck, but the present invention is not limited to this, but may be other working vehicles such as a wheel loader.

A plurality of maps such as the table T2 are provided in accordance with the combination of the values of the suspension pressure and the acceleration sensor in the above embodiment. However, a single map may alternatively be employed to accommodate to the manipulation state like the table T2, and the relationship between the suspension pressure and the acceleration sensor may be stored in a separate table as coefficients. A coefficient of a selected suspension pressure and accelerated sensor may be multiplied to the accommodating table to the manipulation state, so that a threshold map is prepared.

Furthermore, a particular arrangement, shape etc. in implementation of the present invention may be provided in different manner as far as an object of the present invention can be achieved.

INDUSTRIAL APPLICABILITY

The present invention can be applied to a dump truck as well as other working vehicles such as a wheel loader.

The invention claimed is:

1. A retarder control system for a working vehicle with an engine loaded on a vehicle body, a transmission for changing output revolutions of the engine, and driving wheels driven by the output revolutions of the transmission, the retarder control system comprising:
   an input shaft revolution speed detector that detects an input shaft revolution speed of the transmission;
   a running state acquirer that acquires a running state of the working vehicle;
   a threshold map storage that stores a plurality of threshold maps of the input shaft revolution speed at which retarder braking control is started or ended in accordance with a predetermined running state of the working vehicle;
   a threshold map selector that selects a threshold map from the threshold maps stored in the threshold map storage based on the running state acquired by the running state acquirer; and
   a braking controller that controls retarder braking based on the input shaft revolution speed of the transmission detected by the input shaft revolution speed detector and the threshold map selected by the threshold map selector.

2. The retarder control system for the working vehicle according to claim 1, wherein
   the running state acquirer comprises a suspension pressure acquirer that acquires pressure of a hydraulic suspension that supports a load applying on the working vehicle,
   the threshold map storage stores different threshold maps in accordance with predetermined suspension pressure, and
   the threshold map selector selects the threshold map based on the suspension pressure acquired by the suspension pressure acquirer.

3. The retarder control system for the working vehicle according to claim 1, wherein
   the running state acquirer comprises an attitude acquirer that acquires an attitude of the working vehicle,
   the threshold map storage stores different threshold maps in accordance with predetermined attitudes of the working vehicle, and
   the threshold map selector selects a threshold map based on the attitude of the working vehicle acquired by the attitude acquirer.

4. The retarder control system for the working vehicle according to claim 1, wherein
   the running state acquirer comprises a manipulation state acquirer that acquires a manipulation state of a manipulating system for manipulating the working vehicle,
   the threshold map storage stores different threshold maps in accordance with predetermined manipulation states of the working vehicle, and
   the threshold map selector selects a threshold map based on the manipulation state acquired by the manipulation state acquirer.

5. The retarder control system for the working vehicle according to claim 4, wherein
   the manipulation state acquirer detects manipulation states of a shift lever and an accelerator in the manipulating system and
   the threshold map selector selects a threshold map based on a speed stage position of the shift lever and pressing state of the accelerator acquired by the manipulation state acquirer.

6. A retarder control method for a working vehicle with an engine loaded on a vehicle body, a transmission for changing output revolutions of the engine, and driving wheels driven by the output revolutions of the transmission, the method comprising the steps of:
   storing in advance a plurality of threshold maps in accordance with a running state of the working vehicle, the threshold maps mapping input shaft revolution speeds at which retarder braking control starts or ends;
   detecting an input shaft revolution speed of the transmission;
   acquiring a running state of the working vehicle;
   selecting, based on the acquired running state, one of the threshold maps stored in advance; and
   controlling retarder braking based on the detected input shaft revolution speed of the transmission and the selected threshold map.

* * * * *